United States Patent
Wilding et al.

(10) Patent No.: US 7,069,470 B2
(45) Date of Patent: Jun. 27, 2006

(54) SYSTEM AND METHOD FOR INTELLIGENT TRAP ANALYSIS

(75) Inventors: Mark F. Wilding, Barrie (CA); Alexandra G. Bialek, Newmarket (CA); Yung Chung, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 10/256,152

(22) Filed: Sep. 26, 2002

(65) Prior Publication Data

US 2003/0204778 A1 Oct. 30, 2003

(30) Foreign Application Priority Data

Apr. 24, 2002 (CA) .................................... 2383832

(51) Int. Cl.
G06F 11/00 (2006.01)
(52) U.S. Cl. ............................ 714/34; 714/38; 712/244
(58) Field of Classification Search .................. 714/19, 714/38; 712/244
See application file for complete search history.

(56) References Cited

U.S. PATENT DOCUMENTS

| | | | |
|---|---|---|---|
| 3,937,938 A | | 2/1976 | Matthews |
| 4,074,353 A | * | 2/1978 | Woods et al. ................ 710/264 |
| 4,080,650 A | | 3/1978 | Beckett |
| 4,742,449 A | * | 5/1988 | Epstein et al. ............... 712/244 |
| 4,866,665 A | | 9/1989 | Haswell-Smith |
| 4,890,221 A | * | 12/1989 | Gage ........................... 712/228 |
| 4,942,524 A | * | 7/1990 | Nunomura .................... 714/38 |
| 5,463,778 A | * | 10/1995 | Johnson ....................... 712/229 |
| 5,561,774 A | * | 10/1996 | Aikawa et al. .............. 712/244 |
| 5,581,697 A | | 12/1996 | Gramlich et al. |
| 5,644,701 A | | 7/1997 | Takewaki |
| 5,680,620 A | | 10/1997 | Ross |
| 5,761,739 A | | 6/1998 | Elko et al. |
| 5,951,696 A | | 9/1999 | Naaseh et al. |
| 6,009,515 A | * | 12/1999 | Steele, Jr. .................... 712/244 |
| 6,206,584 B1 | | 3/2001 | Hastings |
| 6,253,317 B1 | * | 6/2001 | Knapp et al. ................ 712/244 |
| 6,282,637 B1 | * | 8/2001 | Chan et al. .................. 712/223 |
| 6,311,326 B1 | | 10/2001 | Shagam |
| 6,336,184 B1 | * | 1/2002 | Burke et al. ................. 712/244 |
| 6,633,876 B1 | * | 10/2003 | Heatlie ........................ 707/10 |
| 6,704,862 B1 | * | 3/2004 | Chaudhry et al. ........... 712/244 |
| 6,772,372 B1 | * | 8/2004 | McKee et al. ................ 714/42 |

OTHER PUBLICATIONS

Cristinel Mateis, Markus, Stumptner, Dominik Wieland and Franz Wotawa, JADE—AI Support For Debugging Java Program, IEEE 2000.

IBM Technical Disclosure Bulletin, vol. 35 No. 1A, Jun. 1992, IBM Snapdump for OS/2.

Dr. Dobb's—How Do I Store A Java app In A Self-Executing Encrypted File?, Journal Feb. 1999, By Dave Angel and Andy Wilson.

* cited by examiner

Primary Examiner—Robert Beausoliel
Assistant Examiner—Philip Guyton
(74) Attorney, Agent, or Firm—Duke W. Yee; Jeffrey S. LaBaw; Mari Stewart

(57) ABSTRACT

A method and system for intelligent trap analysis for debugging software on a computer system. Instead of dumping only a register context snapshot or all of memory to a file, a trap handler determines a likely cause of a trapped instruction and selects relevant memory addresses for copying to a file. The relevant memory addresses and their contents are preserved for later analysis. The trap handler may step back through the process instruction list searching for relevant memory addresses referenced by the instructions preceding the trapped instruction. The module may undo the effect of instructions as it steps back through the instruction list.

31 Claims, 2 Drawing Sheets

SYSTEM AND METHOD FOR INTELLIGENT TRAP ANALYSIS

FIELD OF THE INVENTION

The present invention relates to a system and method for debugging software on a computer system and, in particular, to a system and method for intelligent trap analysis for software products.

BACKGROUND OF THE INVENTION

There are certain faults that will cause otherwise healthy software products to fail. These typically include hardware faults or massive software faults, such as attempting to access memory that is invalid or in a manner that is invalid. Examples of fundamental software faults include attempts to access memory using an unaligned memory address or a null pointer. A fundamental fault is a fault so serious in scale that the software product cannot continue to operate and typically needs to halt immediately. For example, the Windows™ operating system may indicate a General Protection Fault (GPF) in the case where a software product attempts to access a memory address that does not exist. In the Unix™ operating system, fundamental faults may generate a "signal", which is a notification to the active process from the operating system that causes the active process to stop what it is doing to deal with the signal. For example, a SIGSEGV signal is triggered when a process attempts to access an illegal memory address. These types of serious faults may be referred to as traps.

When a software product encounters a trap it receives a notification from the operating system and the execution of the process is halted. The operating system may then call a registered function or module for handling the trap. In a typical system, a function or module may be registered with the operating system upon start up as the function to call when a trap is encountered. Such a function or module may be referred to as a "trap handler". By way of example, in the Unix™ operating system, there is a "signal handler" that the operating system will call when a signal is generated. There may be default signal handlers for dealing with particular signals. Other platforms allow a separate trap handler process or program to be notified when a trap occurs, for example, the Windows™ operating system. A trap handler function or module may be custom developed by a software product developer and registered as the handler for a specific signal. For example, with the Unix™ operating system, if the default handler for addressing the SIGSEGV signal is considered inappropriate or inadequate, a developer may design a customized signal handler, using the sigaction () system call. The sigaction () system call accepts a signal number, the new behaviour for the signal (potentially including the signal handler), and the old behaviour for the signal.

Typically, a trap indicates a significant problem that prevents the healthy operation of the software product, so the trap handler will initiate the termination of the process. If the process is unable to recover from the trap, it will typically exit from within the trap handler.

In known systems, the trap handler may perform some basic operations to preserve information for the ex post facto or post mortem review by a software product developer in attempting to identify the source of the trap. The trap handler may be provided with the register context, a pointer to the register context or the ability to get the register context by the operating system. The register context is a snapshot of the operating system registers used by the process or thread. The register context may include the program counter that indicates the address of the trapped instruction, as well as other information. To preserve this information so as to assist the developer in analyzing the trap, the trap handler may open a file, write the register context to the file and then close the file. Other system information that may be written to a file by a trap handler includes the function call stack or stack trace, or a portion of memory corresponding to the list of instructions containing the trapped instruction. The information stored in the file can then be used by the developer to identify the trapped instruction and what the contents of the registers were at the time the trap was encountered.

A problem encountered with known trap handlers is that the preserved information in the file only provides a small snapshot of some basic system information. For example, if the file contains the instruction list and the register context, then during later review the software developer may determine that the trap was encountered upon a load instruction. The developer may deduce that the trap likely relates to an invalid memory location referenced in the load instruction. As the invalid memory location is likely to be an address contained in a register, the developer may be able to trace the source of the invalid address in the register to a previous instruction, which loaded the register with the contents of a particular memory location. In these circumstances, the developer would be unable to trace the problem any further without access to the contents of the memory.

To address the problem of a lack of information, some trap handlers may attempt to preserve a much larger quantity of information, including the contents of any allocated memory locations. In more complex systems, this can result in the dumping of Gigabytes, or in the future Terabytes, of information, which may be expensive, time-consuming and problematic for sending from a software product user to the software developer.

BRIEF SUMMARY OF THE INVENTION

The present invention advantageously provides a system and method for trap handling that assists in identifying and preserving relevant system data so as to enable analysis of the cause of the trap. The present invention further provides a system and method for trap handling that aids in identifying the source of the trap.

In one aspect, the present invention provides a method of intelligent trap analysis for preserving relevant data regarding a trap on a computer system, wherein the computer system has memory and the memory includes a trapped instruction. The method includes the steps of determining a likely cause of the trapped instruction, selecting a relevant memory location, the relevant memory location being related to the likely cause, and preserving the contents of the relevant memory location.

In another aspect, the present invention provides an intelligent trap handler for operation upon a computer system, wherein the computer system has memory and the memory includes a trapped instruction. The trap handler includes a determining means for determining a likely cause of the trapped instruction, a selection means for selecting a relevant memory location, wherein the relevant memory location is related to the likely cause of the trapped instruction, and a preserving means for preserving the contents of the relevant memory location.

In yet another aspect, the present invention provides a system for intelligent trap analysis. The system includes an operating system, a register context, a memory, a list of instructions in the memory, the list of instructions including a trapped instruction, the trapped instruction causing the operating system to generate a trap signal, and an intelligent trap handler.

In a further aspect, the present invention provides a computer program product including a computer readable medium carrying program means for preserving relevant data regarding a trap on a computer system. The program means includes code means for implementing a method of intelligent trap analysis.

The term trap handler is intended to encompass any module, function or process that is called or notified when a process traps.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENTS

Figure 1:
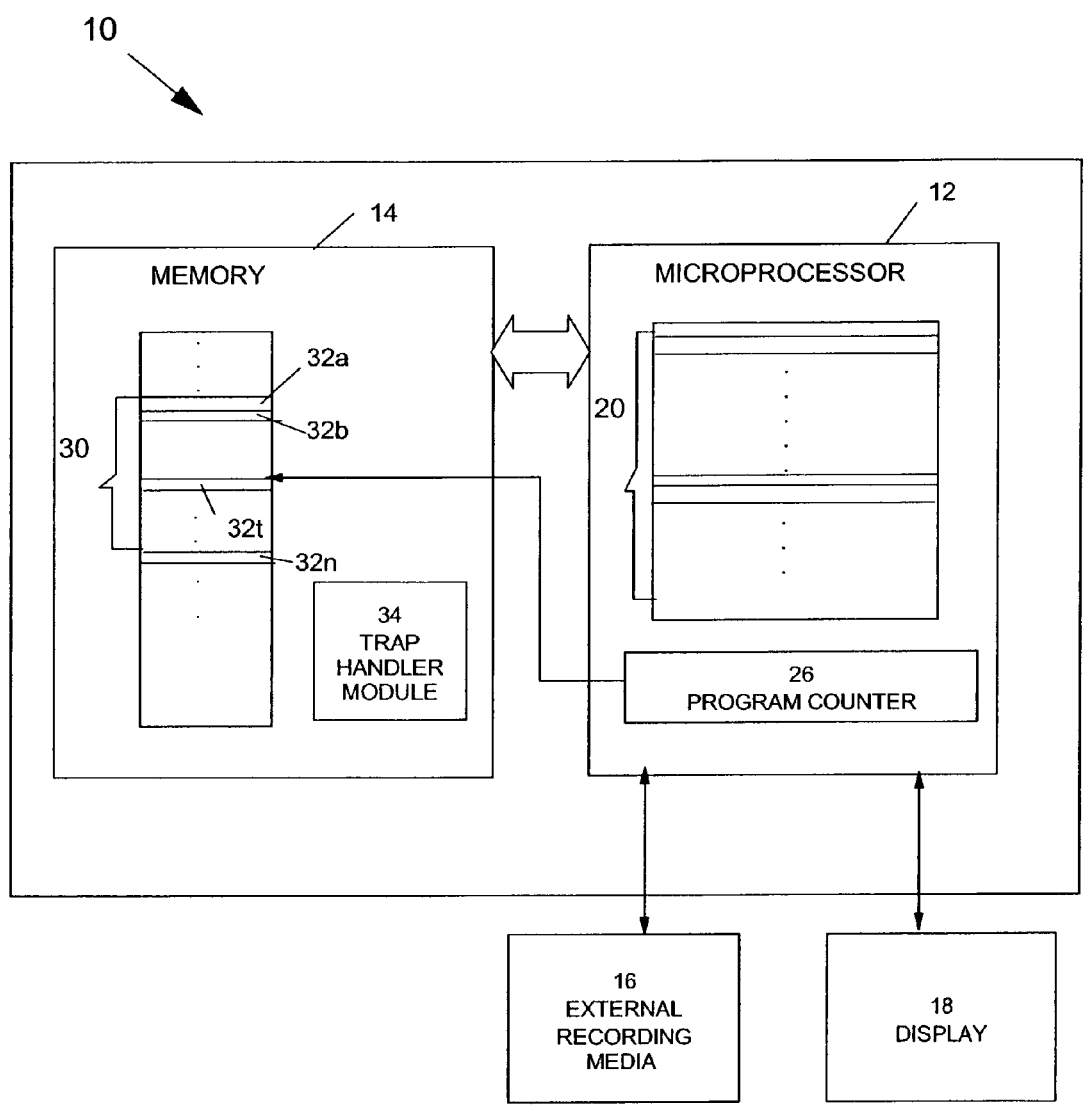
FIG. 1 shows a block diagram of a system for intelligent trap analysis according to the present invention.

Reference is first made to FIG. 1, which shows, in block diagram form, an embodiment of a system 10 for intelligent trap analysis according to the present invention. The system 10 may include a microprocessor 12, a memory 14, an external recording media 16, such as a hard-disk drive or a floppy disk drive, and a display 18. The microprocessor 12 includes a plurality of registers 20 which may include a program counter 26.

The system 10 also includes an operating system (not shown), such as the Microsoft Windows™ operating system or the Unix™ operating system. The system 10 shown in FIG. 1 will be described as an embodiment for operation with a Unix™ operating system, although it will be understood that the present invention may be implemented in conjunction with any operating system.

The memory 14 is addressed read/write memory and includes a plurality of instructions 30. The plurality of instructions 30 contains the sequential instructions 32 (shown individually as 32a, 32b, . . . , 32n) for the process being executed by the system 10. In machine language, the instructions 32 include an operation code (opcode) and one or more operands. The opcode defines the operation being performed, such as adding two values, clearing a location (register or memory address), swapping the contents of two locations, etc. The operands may be source operands or destination operands (or both). The source operands identify the data or the location of the data upon which the operation is to be performed. The destination operands identify where the results of the operation are to be stored. The instructions 32 may further include a label or a tag and a comment.

Included in the instructions 32 is a trapped instruction 32t. The trapped instruction 32t is an instruction which has caused execution of the process to be halted because of a fault or trap. When the system 10 encounters a trap, the operating system halts the execution of the process and generates a trap signal. The type of trap signal generated may indicate the type of problem encountered with the trapped instruction 32t, such as an attempt to access an invalid memory address.

Also included in the memory is a trap handler 34. The trap handler 34 is a registered function called by the operating system when a trap is encountered. When the trap handler 34 is called by the operating system, the operating system may provide the trap handler 34 with the register context or a pointer to the register context. The register context includes the contents of the registers 20 used in the course of executing the process that trapped. The register context may also include the program counter 26.

The program counter 26 contains the address of the trapped instruction 32t or, depending on the design of the microprocessor 12, the address of the instruction following the trapped instruction 32t (since the program counter 26 may have been incremented after the trapped instruction 32t was read but before the microprocessor 12 attempted to execute it and encountered the trap).

In one embodiment, the trap handler 34 causes the register context to be preserved. The trap handler 34 may copy the register context to a file in the memory 14 or on the external recording media 16. Alternatively, if the system 10 is connected to a network or other communications link, the trap handler module 34 may send the register context to a remote location for recordal in a remote memory or recording media. Recordal of the register context may be referred to as "dumping" the context to a file. Hereinafter, this file may be referred to as a dump file.

After dumping the register context, the trap handler 34 attempts to identify the preliminary likely cause of the trap. In identifying the likely cause of the trap, the trap handler 34 may make reference to the trapped instruction 32t, the type of trap signal generated by the operating system, the register context, and the stack trace. The trap handler 34 may include a rule set for determining the likely cause of the trap. The rule set may be incorporated as part of the trap handler 34 function or may be provided as a separate file. The rule set may include a set of conditional statements for assigning a likely cause based upon any of the information to which it makes reference. Alternative means of determining a reason that the trapped instruction 32t caused a trap may include a neural network or other decision-making means. Preliminary likely causes of a trap may include an unaligned memory address or a null pointer referenced by the trapped instruction 32t.

Having identified the preliminary cause of the trap, the trap handler 34 may then attempt to preserve the contents of any memory locations that could be relevant to the source of the trap. For example, if the trap was likely caused by a null pointer in one of the operands in the trapped instruction 32t, then the trap handler 34 may seek to find how that operand (say, a register 20) came to contain the invalid address by looking back through the preceding instructions 32. The trap handler 34 may identify any memory locations that are referred to by the trapped instruction 32t or any preceding instructions 32 that may relate to the source of the trap (in the above example, any instructions 32 which affect the register 20 that contained the invalid address). Any relevant memory locations identified by the trap handler 34 and the contents of those relevant memory locations are preserved, which preferably includes copying them to the dump file.

In one embodiment, the trap handler 34 creates a buffer in the memory 14 and copies the register context into the buffer. This copy of the register context may be referred to as the "rewind context". The trap handler 34 may then attempt to "undo" the effect of instructions 32 as the handler 34 steps back through the list of instructions 32 in an attempt to identify the source of the cause of the trapped instruction 32t. The trap handler 34 may reverse the effect of an instruction 32 upon the rewind context in an attempt to return the rewind context to the state it would have been in prior to the undone instruction 32. The trap handler 34 may then compare the values stored in the registers 20 of the rewind context with the expected values. The expected values may be derived from the real values in memory 14 or in the system registers 20. This information may assist in identifying the source of the trapped instruction 32t.

Figure 2:
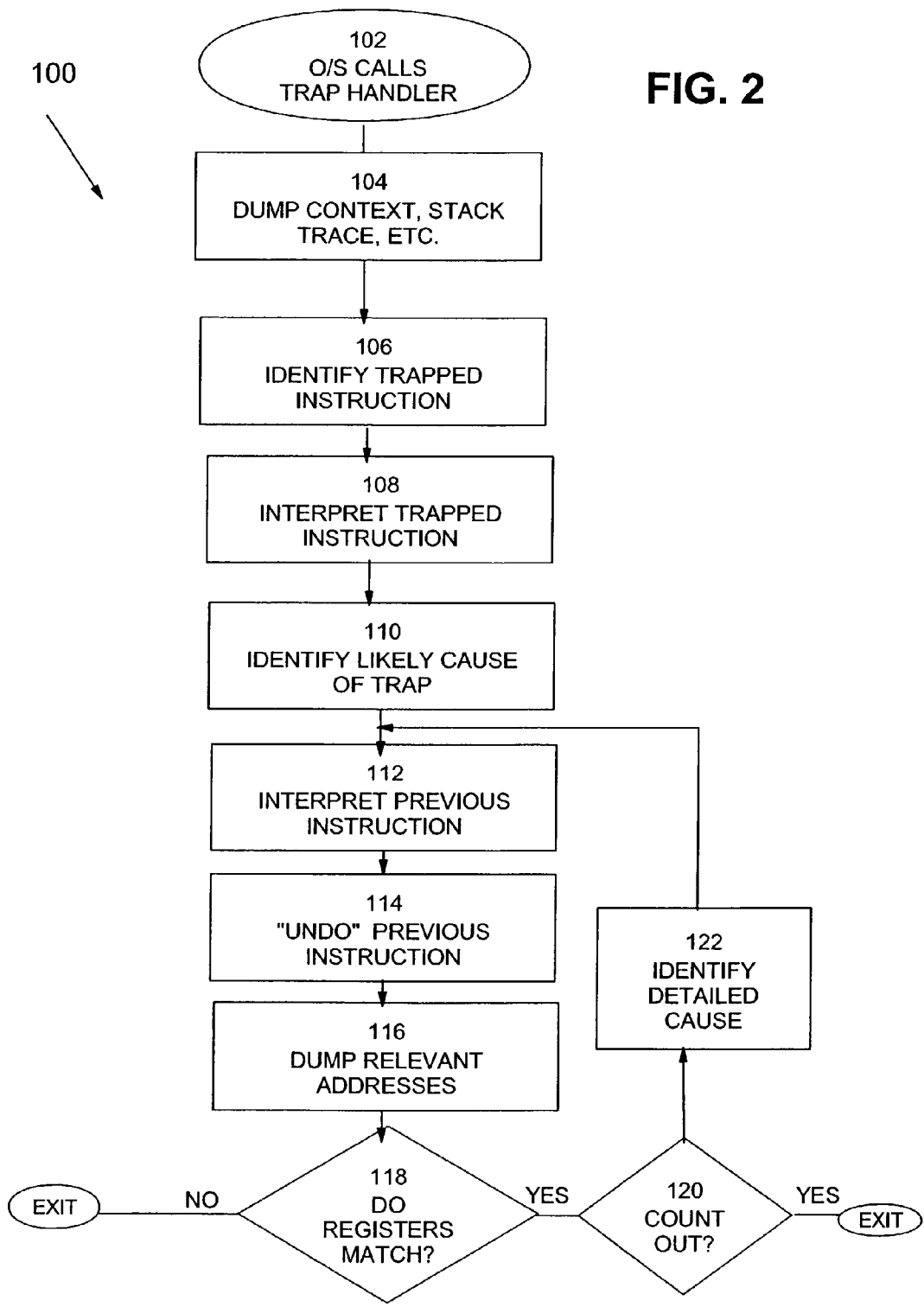
FIG. 2 shows, in flow chart form, a method for intelligent trap analysis according to the present invention.

Reference is now made to FIG. 2, which shows, in flow chart form, a method 100 for intelligent trap analysis according to the present invention. The method may be carried out by the trap handler 34 (FIG. 1).

The method 100 begins in step 102 when the operating system calls the trap handler 34 function. In the arguments for the trap handler call, the operating system may pass the register context, a pointer to the register context or the ability to get the register context to the trap handler 34. From the register context, the trap handler 34 will know the address of the trapped instruction 32t and other system information. Then, in step 104, the trap handler 34 opens a file and copies system information to the file in order to preserve it for later analysis. This file may be referred to as the dump file. The system information dumped by the trap handler 34 may include the register context, a list of instructions 32 from memory 14 including the trapped instruction 32t, the stack trace, trap signal information and other system information.

In one embodiment, the trap handler 34 also copies the register context to a buffer in the memory 14 (FIG. 1). The copy of the register context in the buffer is a "working copy" of the register context for the use of the trap handler 34 in performing analysis and diagnosis. It may be referred to as the rewind context.

In step 106, the trap handler 34 identifies the trapped instruction 32t (FIG. 1). The rewind context contains the program counter 26, which may contain the address of the trapped instruction 32t. Once the trap handler 34 has identified the trapped instruction 32t, it then reads the memory 14 location containing the trapped instruction and interprets the trapped instruction 32t in step 108.

To interpret the trapped instruction 32t, the trap handler 34 interprets the opcode of the trapped instruction 32t and identifies the action that the opcode was intended to implement; in other words, the purpose of the trapped instruction 32t. The opcode may be specific to the hardware architecture of the microprocessor 12 (FIG. 1).

In one embodiment, in addition to interpreting the trapped instruction 32t, the trap handler 34 translates the trapped instruction 32t from machine language into assembly language and writes the assembly language trapped instruction 32t to the dump file. The trap handler 34 may include a translator for interpreting the machine language instructions 32. The trap handler 34 may also translate a set of instructions 32 preceding or following the trapped instruction 32t to their assembly language equivalents and write them to the dump file. In a further embodiment, the trap handler 34 prepares a formatted set of assembly language instructions 32 including the trapped instruction 32t for printing to the dump file. A formatted set of instructions 32, including the trapped instruction 32t and a number of preceding instructions, written in assembly language format, will assist a software developer in performing analysis of the trap based upon the dump file.

In step 110, the trap handler 34 identifies a preliminary likely cause of the trapped instruction 32t. To determine the likely cause of the trapped instruction 32t, the trap handler 34 may consider the opcode of the trapped instruction 32t, the operands of the trapped instruction 32t, the contents of any relevant registers 20 (FIG. 1) or memory 14 addresses referenced by the trapped instruction 32t, and the type of trap signal generated by the operating system. Step 110 may be implemented in the trap handler 34 using a set of rules to determine the likely cause of the trapped instruction 32t. Example rules may include:

1. If either operand of the trapped instruction 32t refers to a memory address using a number unaligned with the boundary of memory locations for the particular microprocessor architecture, then the likely cause may be a misaligned memory address;
2. If either operand of the trapped instruction 32t references a memory address using zero, then the likely cause is a null pointer;
3. If either operand of the trapped instruction 32t references a memory address using a number less than 1024, then the likely cause is a null structure pointer; and
4. If either operand of the trapped instruction refers to a memory address using a number beyond the limit of the stack region of virtual memory, then the likely cause is a low virtual memory.

Those of ordinary skill in the art will understand that further rules or alternative rules may be used to determine the likely cause of the trapped instruction 32t. The determination of likely cause may be implemented in the trap handler 34 as a set of conditional statements, or using other means for analyzing the factors and assigning a likely cause.

Once the trap handler 34 identifies the likely cause of the trapped instruction 32t, it may write the likely cause to the dump file. In one embodiment, the trap handler 34 writes a formatted description of the likely cause of the trapped instruction 32t to the dump file, including an identification of the operand that contained the illegal memory address, if applicable.

The pinpointing of the likely cause of the trapped instruction 32t and the preservation of that information in the dump file assists a developer in performing ex post facto or post mortem analysis of the trap event. To provide further assistance to the developer, the method 100 identifies relevant memory addresses used by the trapped instruction 32t, or, in one embodiment, by instructions preceding the trapped instruction 32t and preserves the contents of those relevant memory locations.

Referring still to FIG. 2, following the identification of the preliminary likely cause of the trapped instruction 32t in step 110, the method 100 proceeds to step 112 wherein the trap handler 34 interprets the instruction preceding the trapped instruction 32t. The trap handler 34 assumes that the previous instruction in the list of instructions 32 was the instruction run immediately prior to the trapped instruction 32t, i.e. that the program did not branch into the trapped instruction 32t.

The interpretation of the previous instruction 32 in step 112 is akin to the interpretation of the trapped instruction 32t in step 108. The trap handler 34 reads the opcode of the previous instruction 32 and identifies the corresponding action that the opcode were intended to implement.

In step 114, the trap handler 34 "undoes" or reverses the effect of the action performed by the previous instruction. For example, if the previous instruction added a constant value to a value stored in a register 20, with the result being stored in the same register 20, then in step 114 the trap handler 34 would subtract the constant value from the value stored in the register 20. As another example, if the previous instruction was a bitwise left shift of a register 20, then in step 114 the trap handler 34 would shift the register 20 to the right by an equivalent number of bits. Note that in this latter case, the trap handler 34 would need to shift in zeros or some other bit pattern as a default since some bit information would have been lost in the original left shift operation. In some cases, the trap handler 34 will not attempt to "undo" an instruction, such as in the case of a load instruction. If the previous instruction had loaded a register 20 with a value from a memory location, the trap handler 34 would be unable to "undo" the load, since it could not know what value had previously been in the register 20. Even if an instruction cannot be "undone", the method 100 may continue. The trap handler 34 implements any changes to the registers 20 resulting from step 114 within the rewind context.

The trap handler 34 may include a set of functions for undoing instructions. These functions may include a plurality of instructions to undo the effect of each machine language instruction recognized by the microprocessor 12 (FIG. 1).

Following step 114, in step 116 the trap handler 34 writes any address locations referenced by the previous instruction and their contents to the dump file. In order to provide a developer with sufficient information to analyze the source of the trap, the trap handler 34 preserves the contents of any relevant memory locations used in the instructions leading up to the trap event. In one embodiment, relevant memory locations include any memory locations referenced by an instruction read in step 112. This is to preserve any memory locations that were used by instructions previous to the trapped instruction 32t.

In another embodiment, the relevant memory locations are limited to memory locations referenced by instructions directly related to the operand in the trapped instruction 32t that may have been identified as the preliminary cause of the trap. For example, if the trapped instruction 32t was caused by a reference to an illegal memory address, and the illegal memory address was contained in a register 20 to which the trapped instruction 32t referred, then the trap handler 34 would consider any memory address locations to be relevant if they were involved in previous instructions that involved that register 20. For instance, a previous instruction may have loaded a value into the register 20 from a memory location. Such a memory location would be considered a relevant memory location. The trap handler 34 may include other criteria for determining the relevance of a memory location to the cause of the trapped instruction 32t.

Reference is now made, by way of example, to the following sample instructions:

instr1 load [r1], r2 (load contents of address in r1 into r2)
instr2 add 999, r2 (add 999 to the value in r2)
instr3 load [r2], r3 (load contents of address in r2 into r3)

Instruction 3 attempts to load the contents of the memory location contained in register 2 into register 3. Instruction 3 may trap if register 2 contains an invalid memory address. In order to find further information about the trap, the trap handler 34 may step back to instruction 2, in which a constant value was added to register 2. Accordingly, the trap handler 34 may subtract the constant value from register 2, placing the result in register 2 (more particularly, to the buffer location in the rewind context corresponding to register 2). As instruction 2 does not reference any memory addresses, the trap handler 34 steps back to instruction 1. Instruction 1 loads register 2 with the contents of the address contained in register 1. The address contained in register 1 was the source of the invalid address that ended up in register 2. Therefore, the trap handler 34 may dump the address location in register 1 and its contents to the dump file. The trap handler 34 may then continue to step back through further instructions. In one embodiment, the trap handler 34 may, in the example, particularly seek instructions which loaded the address into register 1 and instructions which loaded the content into that address location.

Referring again to FIG. 2, after writing any relevant memory addresses and their contents to the dump file, the method 100 proceeds to step 118. In step 118, the trap handler 34 may compare the values contained in one or more of the registers 20 in the rewind context (the "undone" values) with the expected values of those registers 20. The expected values may be determined based upon values stored in the system memory 14 (FIG. 1) or the registers 20 in the rewind context. For example, if the instruction 32 under consideration loads a value from memory to a register 20, then in step 118 the trap handler module 34 compares the value at the actual memory location on the system 10 (FIG. 1) with the value of the register 20 in the rewind context. If the value in the register 20 does not correspond to the expected value, then the trap handler module 34 may exit the method 100. Prior to exiting the method 100, the trap handler module 34 may write the values of the compared register(s) 20 and memory location(s) to the dump file. It may also identify the instruction 32 at which the comparison failed. The cause of the failed match may include a microprocessor 12 (FIG. 1) problem or other hardware problem, an operating system problem, such as an address translation problem, or a stack overrun problem. Unexpected values may also indicate a likelihood that the program branched. Other potential causes will be understood by those skilled in the art.

After step 118, the method 100 will proceed to step 122 before looping back to step 112 to consider the instruction previous to the one just analyzed. As the trap handler 34 steps backwards through the instructions in the list of instructions 32 in memory 14 (FIG. 1) the likelihood that the program branched into the instructions increases and the likely relevance of the instructions to the trap decreases. In order to prevent the method 100 from stepping back through an unreasonably large number of instructions, the number of instructions through which it will trace back may be limited. In one embodiment, the number is limited to sixty-four. Therefore in step 120, prior to step 122, the method 100 determines whether it has traced back through the maximum number of instructions. If so, then it closes the dump file and exits the method 100. Otherwise, it advances to step 122.

In step 122, the trap handler 34 may attempt to identify a more detailed cause of the trapped instruction 32t. For example, if the trapped instruction 32t referenced an invalid address, then the previous instructions may reveal that the address was obtained by a variable that is relative to a stack pointer or a stack frame pointer. Such a variable is an automatic variable. This information aids in debugging the trap, since this points to a possible corrupt or uninitialized automatic variable.

As a further example, in step 122 the trap handler module 34 may find that the problematic address or operand referenced by the trapped instruction 32t received its value through an operation in the previous instruction. The previous instruction may reveal a problematic pointer, memory address or register 20 that is the source of the problematic operand of the trapped instruction 32t. The trap handler 34 may then continue the method 100 in an attempt to pinpoint the source of the problematic operand of the previous instruction. In one embodiment, the trap handler 32 may search through preceding instructions for references to the problematic operand in order to identify its source.

Step 122 may be implemented in the trap handler module 34 as a rule set, in a manner similar to step 110.

After step 122, the trap handler 34 steps back one instruction in the list of instructions 32 in memory 14. In one embodiment, the trap handler 34 maintains an instruction pointer which is initially set to the address of the trapped instruction 32t and which, at the end of step 122, is decremented to point at the preceding instruction. The pointer may be decremented by four or some other integer, depending upon the instruction length for a particular microprocessor 12 (FIG. 1). In one embodiment, the pointer is the copy of the program counter 26 in the rewind context. A count is incremented each time the instruction pointer is decremented so as to track the number of instructions 32 that the trap handler 34 has traced. As will be understood by those skilled in the art, the steps of incrementing the count or stepping back to a preceding instruction may be performed other than at the end of step 122.

Reference will now be made, by way of example, to the following sample assembly language process designed for the SPARC™ microprocessor, in conjunction with the method 100 of FIG. 2:

| 0x001a1950:<br>sqlccipcconnmgr_<br>child + 0x0374: | ldx | [%sp + 0x88], %g1 |
| --- | --- | --- |
| 0x001a1954:<br>sqlccipcconnmgr_<br>child + 0x0378: | ld | [%fp − 0xc], %o3 |
| 0x001a1958:<br>sqlccipcconnmgr_<br>child + 0x037c: | ld | [%o3], %o1 |
| 0x001a195c:<br>sqlccipcconnmgr_<br>child + 0x0380: | cmp | %o1, 0x0 |
| 0x001a1960:<br>sqlccipcconnmgr_<br>child + 0x0384: | be, a, pt | %icc, splccipcconnmgr_child + 0x33c |
| 0x001a1964:<br>sqlccipcconnmgr_<br>child + 0x0388: | st | %l5, [%fp − 0xc0] |

If the above-referenced process trapped at instruction 0x001a1958 with a SIGSEGV signal, then the trap handler 34 would, at step 108 of the method 100, recognize that the trapped instruction 32t is a load command that attempted to load the contents of the memory location contained in register %o3 into register %o1. In step 110, the trap handler 34 would determine that the register %o3 likely contains an invalid address value. It may make this determination based upon the fact that the opcode of instruction 0x001a1958 is a load command, that the trap signal is a SIGSEGV signal, that the source register %o3 contains the value 0x18 (which information would be available in the rewind context), the list of valid memory regions, or all or any combination of the foregoing. Based upon the foregoing facts, the trap handler 34 may more precisely determine in step 110 that the likely cause of the trap is a null structure pointer. This analysis information may be preserved in the dump file.

At step 112, the trap handler 34 steps back to instruction 0x001a1954 which it would recognize as a load command. Instruction 0x001a1954 loaded register %o3 with the contents of the address pointed to by the frame pointer register %fp less 0xc. The register context may not contain the memory for the process' stack in which the frame pointer register would be stored. Accordingly, the trap may not be traced using only a dump of the register context. However, according to the present invention, relevant locations of the memory, such as the frame pointer register %fp, may be identified and preserved by the trap handler 34. The value in the frame pointer register %fp may, in the present example, be 0xFFBEB9F0. Accordingly, the memory address referenced in instruction 0x001a1954 (the frame pointer minus 0xc) may be 0xFFBEB9E4. At step 116, the trap handler 34 records the memory location 0xFFBEB9E4 and its contents in the dump file. In the example, the contents of the memory location may be 0x18, which was the value loaded into register %o3. Accordingly, the memory location 0xFFBEB9E4 was a source of the null structure pointer in the trapped instruction 32t. The trap handler 34 may then step back further in the instruction list 32 to capture other relevant memory locations. In step 122, the trap handler 34 may further observe that the origin of the bad address in the trapped instruction 32t is relative to the frame pointer %fp, which indicate a likely problem with an automatic variable. Accordingly, the trap handler 34 may direct the developer to consider the automatic variables for the function which contained the trapped instruction 32t.

In one embodiment, the trap handler 34 records relevant data in a report format in the dump file. Alternatively, it may send a report to the display 18 (FIG. 1), an external device like a printer, or to a remote computer. The report may, for example, be in the following form:

Signal: SIGSEGV at sqlccipcconnmgr_child + 0x037c
Reason: Invalid pointer on stack
Relevant Instructions:

| 0x001a1954:sqlccipcconnmgr_child + 0x0378: | ld | [%fp − 0xc], %o3 |
| --- | --- | --- |
| 0x001a1958:sqlccipcconnmgr_child + 0x037c: | ld | [%o3], %o1 |

Details:

Register %o3 set at sqlccipcconnmgr_child + 0x0378 using memory address [%fp − 0xc] or 0xFFBEB9E4
Value at 0xFFBEB9E4: 0x18
Likely Cause:

A structure pointer is NULL
Likely an automatic variable of the function "sqlccipcconnmgr_child"

Although the above-described embodiment was provided in the context of a Unix™-based operating system, those skilled in the art will understand that the present invention may be implemented in conjunction with other operating systems or platforms and is not limited to use with platforms having a registered signal handler.

Using the foregoing specification, the invention may be implemented as a machine, process or article of manufacture by using standard programming and/or engineering techniques to produce programming software, firmware, hardware or any combination thereof.

Any resulting program(s), having computer readable program code, may be embodied within one or more computer usable media such as memory devices, transmitting devices or electrical or optical signals, thereby making a computer program product or article of manufacture according to the invention. The terms "article of manufacture" and "computer program product" as used herein are intended to encompass a computer program existent (permanently, temporarily or transitorily) on any computer usable medium.

A machine embodying the invention may involve one or more processing systems including, but not limited to, central processing unit(s), memory/storage devices, communication links, communication/transmitting devices, servers, I/O devices, or any subcomponents or individual parts of one or more processing systems, including software, firmware, hardware or any combination or sub-combination thereof, which embody the invention as set forth in the claims.

One skilled the art of computer science will be able to combine the software created as described with appropriate general purpose or special purpose computer hardware to create a computer system and/or computer sub-components embodying the invention and to create a computer system and/or computer sub-components for carrying out the method of the invention.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

The embodiments of the invention in which an exclusive property or is claimed are defined as follows:

1. A method of intelligent trap analysis for preserving relevant data regarding a trap on a computer system, the computer system having memory, the memory containing a trapped instruction, the method comprising the steps of:
    identifying the trapped instruction within a plurality of instructions, wherein the trapped instruction is an instruction that caused the trap;
    determining a likely cause of the trapped instruction, wherein a likely cause of the trapped instruction is a reason that the trapped instruction caused the trap;
    selecting a relevant memory location, said relevant memory location being related to said likely cause; and
    preserving the contents of said relevant memory location.

2. The method claimed in claim 1, wherein said relevant memory location includes a memory location referenced by the trapped instruction.

3. The method claimed in claim 1, wherein said relevant memory location includes a memory location referenced by an instruction previous to the trapped instruction, and wherein the instruction previous to the trapped instruction is an instruction run prior to the trapped instruction.

4. The method claimed in claim 1, wherein said memory contains a list of sequential instructions, said instructions including the trapped instruction, the method further including a step of interpreting at least one instruction preceding the trapped instruction, wherein the instruction preceding the trapped instruction is an instruction run prior to the trapped instruction.

5. The method claimed in claim 4, further including a step of undoing the effect of said at least one instruction.

6. The method claimed in claim 5, wherein said steps of interpreting, undoing, selecting and preserving are repeated sequentially in a loop, a first iteration of said loop involving the instruction preceding the trapped instruction, wherein each subsequent iteration involves an instruction previous to the instruction involved in the preceding iteration.

7. The method claimed in claim 6, wherein said looped repetition is limited to a predetermined maximum number of iterations.

8. The method claimed in claim 4, wherein said steps of interpreting, selecting and preserving are repeated sequentially in a loop, a first iteration of said loop involving the instruction preceding the trapped instruction, wherein each subsequent iteration involves an instruction previous to the instruction involved in the preceding iteration.

9. The method claimed in claim 8, wherein said looped repetition is limited to a predetermined maximum number of iterations.

10. The method claimed in claim 1, wherein the trapped instruction includes an opcode and operands and said step of determining includes identifying the opcode and operands.

11. The method claimed in claim 1, wherein the step of determining includes assigning the likely cause based upon a rule set.

12. The method claimed in claim 1, wherein said computer system include a register context, and wherein said method further includes a step of copying the register context to a buffer in the memory.

13. The method claimed in claim 12, further including a step of undoing the effect of said at least one instruction wherein said step of undoing is performed upon the copy of the register context in said buffer.

14. The method claimed in claim 1, wherein the likely cause of the trapped instruction includes a null structure pointer.

15. The method claimed in claim 1, wherein the likely cause of the trapped instruction includes an unaligned memory address.

16. The method claimed in claim 1, wherein the step of preserving includes copying the contents of said relevant memory location to a file, wherein relevant data related to the likely cause of a trap is preserved.

17. The method claimed in claim 1, further including a first step of receiving notification from the operating system that a trap has occurred.

18. An intelligent trap handler for operation upon a computer system, the computer system having memory, the memory containing a trapped instruction, the handler comprising:
    identifying the trapped instruction within a plurality of instructions, wherein the trapped instruction is an instruction that caused the trap;
    a determining means for determining a likely cause of the trapped instruction, wherein a likely cause of the trapped instruction is a reason that the trapped instruction caused the trap;
    a selection means for selecting a relevant memory location, said relevant memory location being related to said likely cause of the trapped instruction; and
    a preserving means for preserving the contents of said relevant memory location.

19. The trap handler claimed in claim 18, wherein said relevant memory location includes a memory location referenced by the trapped instruction.

20. The trap handler claimed in claim 18, wherein said relevant memory location includes a memory location referenced by an instruction previous to the trapped instruction and wherein the instruction previous to the trapped instruction is an instruction run prior to the trapped instruction.

21. The trap handler claimed in claim 18, wherein said memory contains a list of sequential instructions, said instructions including the trapped instruction, and wherein said selection means includes means for interpreting at least one instruction preceding the trapped instruction in the function stack, wherein the instruction preceding the trapped instruction is an instruction run prior to the trapped instruction.

22. The trap handler claimed in claim 21, further including a reversing means for undoing the effect of said at least one instruction preceding the trapped instruction.

23. The trap handler claimed in claim 18, wherein the trapped instruction includes an opcode and operands and wherein said module further includes interpretation means includes means for identifying said opcode and said operands.

24. The trap handler claimed in claim 18, wherein said determining means includes a rule set, said rule set prescribing said likely cause in response to said interpretation means.

25. The trap handler claimed in claim 18, wherein said computer system includes a register context and wherein said handler further includes a means for creating a buffer in the memory and copying the register context to said buffer.

26. The trap handler claimed in claim 25, further including a reversing means for undoing the effect upon the copy of the register context of said at least one instruction preceding the trapped instruction.

27. The trap handler claimed in claim 18, wherein the likely cause of the trapped instruction includes a null structure pointer.

28. The trap handler claimed in claim 18, wherein the likely cause of the trapped instruction includes an unaligned memory address.

29. The trap handler claimed in claim 18, wherein said preserving means includes means for copying the contents of said memory location to a file, wherein relevant data relating to the likely cause of a trap is preserved.

30. A system for intelligent trap analysis, the system comprising an operating system;
   registers;
   memory;
   a list of instructions in said memory, said instructions including an identified trapped instruction, the trapped instruction causing the operating system to generate a trap signal; and
   a trap handler, said trap handler including a determining means for determining a likely cause of said trapped instruction, wherein a likely cause of the trapped instruction is a reason that the trapped instruction caused the trap; a selection means for selecting a relevant memory location, said relevant memory location being related to said likely cause of said trapped instruction; and a copying means for copying the contents of said relevant memory location to a file, wherein relevant data relating to the likely cause of a trap is preserved.

31. A computer program product comprising:
   a tangible computer usable medium having computer usable program code for preserving relevant data regarding a trap on a computer system, wherein the computer system has a memory and a function stack, and wherein the function stack includes a trapped instruction, said computer usable program product including:
   computer usable program code for identifying the trapped instruction within a plurality of instructions, wherein the trapped instruction is an instruction that caused the trap:
   computer usable program code for determining a likely cause of the tapped instruction, wherein a likely cause of the trapped instruction is a reason that the tapped instruction caused the trap;
   computer usable program code for identifying a relevant memory location, said relevant memory location being related to said likely cause; and
   computer usable program code for copying the contents of said relevant memory location to a file.

* * * * *